United States Patent [19]

Botros

[11] 4,066,388
[45] Jan. 3, 1978

[54] DISAZO DYES DERIVED FROM 1-ACYL-2,4-DIHYDROXYBENZENES AND METALLIZED POLYOLEFIN DYED THEREWITH

[75] Inventor: Raouf Botros, Beech Creek, Pa.

[73] Assignee: American Color & Chemical Corporation, Charlotte, N.C.

[21] Appl. No.: 692,932

[22] Filed: June 4, 1976

[51] Int. Cl.² .................. C09B 31/20; C09B 33/04; D06P 1/04; D06P 3/79
[52] U.S. Cl. .................................... 8/41 D; 8/180; 260/186; 260/187; 260/190; 260/191; 260/205; 260/592
[58] Field of Search ............... 260/186, 187, 190, 191, 260/206; 8/41 D

[56] References Cited

U.S. PATENT DOCUMENTS

| 3,045,004 | 7/1962 | Gaetani | 260/186 |
| 3,096,140 | 7/1963 | Gaetani | 260/186 X |
| 3,389,956 | 6/1968 | Mohr et al. | 260/207 X |

FOREIGN PATENT DOCUMENTS

| 1,129,450 | 5/1962 | Germany | 260/186 |

Primary Examiner—Floyd D. Higel
Attorney, Agent, or Firm—Armstrong, Nikaido & Marmelstein

[57] ABSTRACT

Disazo dyes of the general formula:

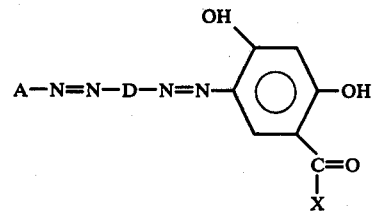

are provided where A is phenyl, naphthyl, phenyl substituted by up to 3 substituents or naphthyl substituted by up to 2 substituents; D is phenyl, naphthyl, or phenyl or naphthyl substituted by up to 2 substituents selected from alkyl of 1-4 carbon atoms, alkoxy of 1-4 carbon atoms or halogen and X is alkyl of 1-4 carbon atoms, benzyl or phenyl. The dyes when applied to metallized polyolefin fabrics, particularly nickel-containing polypropylene fabrics, produce strong bright shades which are exceptionally fast to light, dry cleaning, crocking, gas and heat.

9 Claims, No Drawings

DISAZO DYES DERIVED FROM 1-ACYL-2,4-DIHYDROXYBENZENES AND METALLIZED POLYOLEFIN DYED THEREWITH

BACKGROUND OF THE INVENTION

1. Field of the Invention

The present invention relates to azo dyes useful in the dyeing of polyolefins. More particularly, the invention relates to acyldihydroxybenzenedisazo dyes which have utility in the dyeing of metallized, or metal-containing, polyolefin, especially nickel-containing polypropylene, textile materials.

2. Description of the Prior Art

Polypropylene, because of its excellent mechanical strength, high elasticity and resistance to solvents, has found increased utility in recent years as filaments, yarns, fabrics, ropes and the like. Commercially available polypropylene materials generally contain metals or metal salts or chelates to provide stability against degradation due to light. These metals or metal salts or chelates also serve to provide reactive sites for dyes.

Dyes, more particularly, chelatable dyes, having specific utility in the dyeing of such metal-containing, or metal-modified, polypropylene are reported extensively in the literature. Chelatable azo dyes disclosed for use in dyeing metallized polyolefin commonly contain o,o'-dihydroxyazo; o-hydroxy-0'-carboxyazo; o-hydroxy-o'-aminoazo; or o-carboxy-o'-aminoazo chelatable groups. Certain azomethine structures similarly substituted ortho to the —C=N— link have also been reported.

Thus, for example, Siegrist et al, U.S. Pat. No. 3,399,027, discloses a process for dyeing polyolefins containing organic nickel chelate complexes with an aqueous dispersion of an azomethine dye. As the azomethine dyes there are disclosed dyes of the formulas:

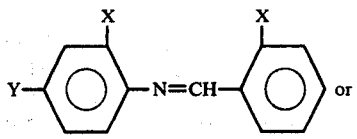

or

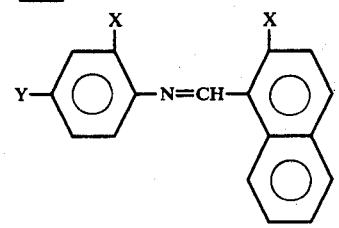

where
X is OH or COOH, and
Y is phenylazo or naphthylazo.

Mohr et al, U.S. Pat. No. 3,389,956, discloses the dyeing of nickel modified polypropylene textiles with an acyl-o,o'-dihydroxyazo or acyl-o-hydroxy-o'-carboxyazo dye of the formula:

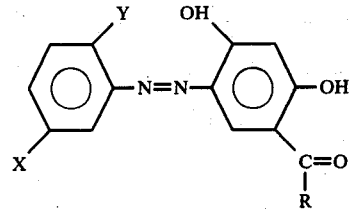

Y being hydroxy or carboxy.

Dyes having chelatable groups of the o,o'-dihydroxyazo and o-hydroxy-o'-carboxyazo type, however, do not produce acceptable shades on metallized polypropylene. Although these groups apparently bind strongly to the metal compound contained in the polypropylene and give dyeings having excellent fastness to rubbing, washing and dry cleaning, they tend to produce dull and rather weak colors. These dyes are also disadvantageous in that there is a drastic change in hue between the unchelated and chelated dyes which can cause unevenness on the metallized fiber depending on the concentration of metal throughout the fiber. This difference in hue between chelated and unchelated dyes may also cause differences in hue between the dyed pile of a carpet of a metal-containing polypropylene and the carpet backing, which is usually made from non-chelatable materials.

It is an object of the present invention, therefore, to provide dyes suitable for dyeing metal-containing, or metal-modified, polyolefins, and particularly, polypropylene, and which avoid or minimize the problems associated with the chelatable dyes heretofore employed in the art.

This and other objects of the invention will become apparent from the following summary and description of preferred embodiments.

SUMMARY OF THE INVENTION

According to the present invention, acyldihydroxybenzenedisazo dyes are provided which produce strong, bright shades when applied to metal-containing polypropylene fabrics and which are exceptionally fast to light, dry cleaning, crocking, gas and heat.

The dyes according to the invention may be represented by the general structure (I):

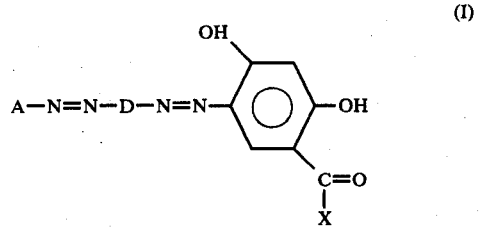

(I)

wherein A is a benzene or naphthalene nucleus, said benzene or naphthalene nucleus being unsubstituted or substituted with any of alkyl of 1–4 carbon atoms; alkoxy of 1–4 carbon atoms; nitro; cyano; halogen; trifluoromethyl; hydroxy; acyloxy; carboxy or carbalkoxy (of 1–4 carbon atoms in the alkyl moiety);

D is a benzene or naphthalene nucleus which is unsubstituted or mono or disubstituted with any of alkyl of 1–4 carbon atoms, alkoxy of 1 –4 carbon atoms or halogen; and X is alkyl of 1-4 carbon atoms, benzyl or phenyl which is unsubstituted or substituted with up to two substituents independently selected from alkyl of 1-4 carbon atoms, alkoxy of 1-4 carbon atoms or halogen.

According to another embodiment of the invention there is provided metal-modified polyolefin textile material dyed with a dye of the general formula (I). The dyed polyolefin textile material has outstanding fastness properties.

DESCRIPTION OF PREFERRED EMBODIMENTS

In the dyes of the general formula (I), the member A is a benzene or naphthalene nucleus, the benzene nucleus being unsubstituted or substituted with up to three substituents and the naphthalene nucleus being unsubsituted or substituted with up to two substituents, the substituents being independently selected from alkyl of 1-4 carbon atoms; alkoxy of 1-4 carbon atoms; nitro; cyano; chlorine; bromine; trifluoromethyl; hydroxy; acyloxy (RCOO—, where R is alkyl of 1-4 carbon atoms); carboxy; or carbalkoxy (ROOC—, where R is alkyl of 1-4 carbon atoms). Substitution in the benzene nucleus relative to the azo link will typically be in the 2-position, the 3-position, the 4-position, the 2,4-positions, the 2,5-positions, the 2,4,6-positions, the 2,3,4-positions and the 2,4,5-positions. Substitution in the naphthalene nucleus will typically be in the 2-position, the 4-position, the 5-position, the 8-position, the 2,3-positions, the 2,4-positions and the 2,6-positions.

D of the dyes of the present invention is a benzene or naphthalene nucleus which is unsubstituted or mono or disubstituted. The substituents may be the same or different and are selected from alkyl of 1-4 carbon atoms, alkoxy of 1-4 carbon atoms, chlorine and bromine. Substitution in the benzene nucleus will typically be in the 2-position, 3-position, 2,5-positions or 2,3-positions. The naphthalene nucleus will typically be unsubstituted.

The member X of the dyes according to the present invention is selected from alkyl of 1-4 carbon atoms benzyl and phenyl. The phenyl may be optionally substituted with up to two substituents independently selected from alkyl of 1-4 carbon atoms, alkoxy of 1-4 carbon stoms, chlorine and bromine. Typically, the phenyl group will be unsubstituted.

The dyes are obtained by diazotizing an aminoazo base of the formula A—N=N—D—NH$_2$, where A and D are as defined above, and coupling into the appropriate 1-acyl-2,4-dihydroxybenzenes.

Suitable aminoazo bases can be made by the rearrangement of diazoamino compounds (or triazenes) by well-established methods. Examples are p-aminoazobenzene and certain aminoazotoluenes. A general way to make the aminoazo base is to couple a diazotized aromatic amine into the same or different primary aromatic amine having an available coupling position. In certain cases, it is desirable to promote the coupling and to protect the primary amine by a group which can be removed by hydrolysis after coupling. The technique often used is the formation of the anilinomethanesulfonic acid. Commercially available aminoazo bases such as p-aminoazobenzene and o-tolylazo-o-toluidine are, of course, suitable for preparing the dyes.

As the aromatic amines (A-NH$_2$) suitable for preparing the aminoazo base, there may be mentioned anilinecarboxylic acids, such as anthranilic acid, 5-chloro-2-aminobenzene-1-carboxylic acid, and 5-nitro-2-amino-benzene-1-carboxylic acid; hydroxy substituted amines such as 1-amino-2-hydroxybenzene, 2-hydroxy-4- or 5-nitroaniline and 2-hydroxy-5-chloroaniline; 4-nitroaniline; orthoanisidine; 3-chloro-o-toluidine; 4-nitro-3-chloro-o-toluidine; p-ethylaniline; p-butylaniline; 2-chloro-5-trifluoromethylaniline; 4-nitro-2-chloroaniline; 2,6-dichloroaniline; 2,4-dimethoxyaniline; 1-naphthylamine; 1-amino-2-naphthol and 6-amino-2-naphthol-3-carboxylic acid; 4-nitro-1-naphthylamine; 2,4-dichloro-1-naphthylamine; 5-bromo-1-naphthylamine; 4-methoxy-1-naphthylamine and 5,7-dichloro-1-naphthylamine.

As the aromatic amines (D—NH$_2$) for preparing the aminoazo base there may be mentioned orthoanisidine; 3-chloro-o-toluidine; 2,6-dichloroaniline; 1-naphthylamine; 5-bromo-1-naphthylamine and 5,7-dichloro-1-naphthylamine and the like. The choice of aromatic amines to be employed in preparing the aminoazo base will generally be limited only by economic considerations and availability.

Suitable 1-acyl-2,4-dihydroxybenzenes which can be used as couplers include 2,4-dihydroxybenzophenone, 2,4-dihydroxyacetophenone and 2,4-dihydroxypropiophenone. All 1-acyl-2,4-dihydroxybenzenes where X is as defined above are believed to be useful in preparing dyes according to the present invention, which when applied to metal-containing, particularly, nickel-containing, polypropylene will give the outstanding properties noted above. The actual choice of couplers, however, will again be limited generally by economic considerations and availability.

Diazotization of the aromatic amine to form the aminoazo base and diazotization of the aminoazo base and coupling of the diazotized base into the appropriate couplers are carried out in conventional ways. Diazotization is effected by heating the aromatic amine or aminoazo base (if necessary to achieve solution) in an aqueous solution of strong mineral acid such as hydrochloric acid, cooling the resulting solution to a temperature of 0°-10° C., and adding thereto a quantity of sodium nitrite slightly in excess of the stoichiometric requirement. An alternate method of diazotization involves dissolving sodium nitrite in concentrated sulfuric acid, heating to a temperature of about 60°-70° C., cooling the resulting solution to 0°-10° C. and adding thereto the aromatic amine or aminoazo base.

The coupling reaction is carried out by adding the diazonium salt to a cold aqueous alkaline solution of the respective coupler. The mixture is allowed to react until the coupling is essentially complete, usually in 1-24 hours at 0° C. to room temperature and is thereafter filtered and washed with water or water containing dissolved sodium chloride. The product may be reslurried in water which is then made acidic to Congo Red paper with hydrochloric or other acid. The mixture is filtered and the cake is washed neutral with water. The desired azo product is thus obtained in the form of a moist cake. The product may be used in this form or it may be dried before grinding with a suitable agent to form a disperse paste or powder as described below.

The disazo dyes (I) of the present invention have outstanding utility in the dyeing of metal-containing polyolefins and especially, nickel-containing polypropylene fiber materials. The dyed metal-modified polypropylene fiber materials according to the present invention include as the starting polypropylene fiber material any of the conventionally produced polypropylene materials generally designated in the textile art as "polypropylene fibers", which contain Werner Complex-forming metal such as aluminum, chromium, cobalt, and zinc, either as such or in the form of its salts or chelates. The exact metal content of these fibers is not generally specified by the manufacturer, but is believed to vary within the range of about 0.1 to about 2.0 weight percent. The metal improves the dyeing properties of the fiber materials and also serves to stabilize the materials against degradation due to light and heat. Nickel-containing polypropylene materials dyed with the structure of formula (I) have been shown to have excellent fastness properties. Such nickel-containing polypropylene materials are available commercially, for example, under the trademark HERCULON.

To prepare the dye for application to the metal-modified fiber substrates, it must be suitably dispersed. This may be done by any of several well-known methods, e.g., milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersants for powders, or water for pastes. Other materials such as preservatives, foam-control agents, and wetting agents (for powders) may be added as desired.

Dispersed pastes are made by wet milling the azo material in conventional equipment in the presence of a dispersing agent, preferably sodium lignin sulfonate or sodium alkyl-naphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The disperse paste may be cut or standardized to a standard strength with water. The final color content of the finished paste is usually from 5–40 percent by weight (pure color) active dye base.

Disperse powders are prepared by wet milling color in the presence of a dispersant, such as those mentioned above, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent, such as sodium cetyl sulfate or an alkyl aryl polyether alcohol may be added to aid in wetting out the product when it is placed in the dye bath. Disperse powders are usually cut or standardized to 10–50 percent by weight color content (pure color).

The disperse dyes may be applied to the metal-containing polypropylene fibers or fabrics in a conventional manner and may be applied, for example, as neutral, acidic, or alkaline aqueous suspensions, with the use of dispersing agents, from a dyebath, preferably at temperatures of from 50° C to 105° C. When temperatures of less than about 100° C. are employed, it is sometimes advantageous to add a customary carrier substance. These dyes can also be applied to the metal-containing polypropylene fabrics by a printing process. The printing paste can be thickened with customary thickening agents and may also contain other additives conventionally used with printing pastes. The printing paste is expediently applied to the fabric by a printing block or a roller, after which the printed fabric is dried and steamed at a temperature between 105° C and 110° C. After the dyeing or printing of the polypropylene material, it is treated with a hot aqueous soap solution, rinsed and dried. As suitable dyeing and printing techniques there may be mentioned those described in U.S. Pat. Nos. 3,399,027; 3,399,952; 3,492,078; 3,556,709; and 3,360,656.

Nickel-containing polypropylene carpet printed with dyes of the formula (I) show excellent fastness properties. The fabric is colored with strong, bright orange shades which are exceptionally fast to light, dry cleaning, crocking, gas and heat.

The invention may be better understood by referring to the working examples set forth below. In the working examples, the properties of dyed or printed polypropylene were evaluated according to the following tests:

Test No. 1: (Crocking) A crock test on an air dried sample, i.e., a portion of printed or dyed fiber, fabric or carpet construction, conducted in accordance with AATCC Test Method 8-1972, page 112 of the 1974 Technical Manual of the AATCC.

Test No. 2: (Heat stability) A heat stability test determined by subjecting an air dried sample to a heat treatment of 250° F for 20 minutes. The heat treated sample is compared to an air dried sample with respect to shade change.

Test No. 3: (Crocking) The sample from Test No. 2 is tested for crocking according to the procedure of Test No. 1. There should be no change in crocking.

Test No. 4: (Light fastness) A practical strength of a dyed or printed air dried sample is exposed to a Xenon arc lamp (AATCC Test Method 16E-1974, page 133 of the 1974 Technical Manual of the AATCC). A range of 3L4 to 4L4 exposures are the lower limit of desirability in the carpet trade.

Test No. 5: (Dry cleaning) An air dried sample is tested for color fastness to dry cleaning in accordance with AATCC Test Method No. 132-1973, page 117 of the 1974 Technical Manual of the AATCC.

EXAMPLE I

A. Preparation of the Azo Compound

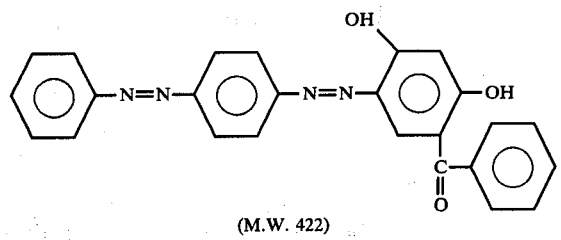

(M.W. 422)

A mixture of 19.7 g. 4-aminoazobenzene in 35 g. 32% hydrochloric acid and 200 ml. water was diazotized at 0° C with a solution of 8.1 g. sodium nitrite dissolved in 50 ml. water. After stirring 2 hours at 0 C, excess nitrous acid was destroyed with sulfamic acid and the diazo solution was clarified. The clear diazo solution was added during one half hour at 0° C to a solution of 21.4 g. 2,4-dihydroxybenzophenone in 500 ml. water, 8 g. sodium hydroxide flakes and 42 g. sodium carbonate. After coupling was complete, the mixture was filtered and the cake was washed with water. The product was then reslurried in water and was made acidic to Congo Red paper with hydrochloric acid. The mass was filtered and the cake was washed neutral with water.

Yield: 31.4 g. Theory: 42.2 g.

30 g. of the product of (A) was charged to a sandmill with 45 g. Lignosol FTA (a commercially available ligninsulfonic acid dispersant sold by Lignosol Chemicals, Quebic, Canada) and 225 ml. water. The mixture was sandmilled until dispersion test was satisfactory.

Yield: 300 g. 10% Color Content Paste

B. Dyeing of a Nickel-Containing Polypropylene from a Dyebath. Piece goods of "Herculon" isotactic polypropylene containing a bis(p-alkylphenol)monsulfide nickel compound in the amount of about 0.12% calculated as metallic nickel by weight based on the weight of the polypropylene, were placed in a bath set at 35° C containing 1% Triton X-100 (iso-octylphenyl-poly-ethoxyethanol) based on weight of fiber, 1.0 – 1.5% acetic acid (pH 3–4) and 1.0% (based on weight of fiber) dispersion of the dye from (A). The dyed fabrics were colored a brilliant reddish orange shade having outstanding light fastness and excellent resistance to crocking, dry cleaning solvents and gas fading. The dyed fabrics, did not show any color change in shade after heat treatment.

C. Dyeing of a Nickel-Containing Polypropylene with a Printing Paste

A printing paste was prepared with 1000 parts of Tragacanth gum thickener (polysaccharides of galactose, fructose, xylose and arabinose with glucuronic acid), 5 parts acetic acid and a quantity of dispersed dye corresponding to 5 to 10 parts of a pure dye obtained in (A). A fabric made of fibers of polypropylene containing nickel (Herculon Type 40) was printed on a roller. The fabric was dried and steamed for 8 minutes at 105°–110° C. The fabric was vigorously washed in a bath of soap at 90° C. The printed fabrics were colored bright reddish orange of fastness properties similar to those obtained in (B).

EXAMPLE II

To prepare the azo compound:

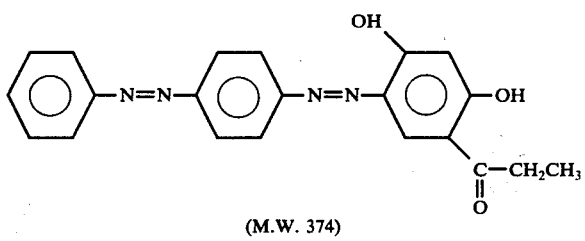

(M.W. 374)

a diazo solution of 29.6 g. 4-aminoazobenzene was prepared as described in Example I (A). It was then added during one half hour at 0° C to a solution of 24.9 g. 2,4-dihydroxypropiophenone in 500 ml. water, 12 g. sodium hydroxide beads and 25 g. sodium carbonate. After coupling was complete, the mixture was filtered and the cake was washed with water. The product was then reslurried in water and was made acidic to Congo Red paper with hydrochloric acid. The mass was filtered and the cake was washed neutral with water.

Yield: 47.2 g. Theory: 56.1 g.

The dispersed product when printed on nickel-containing polypropylene in the manner of Example I(C), produced orange shades of excellent color value and light fastness. The printed fabrics also had outstanding resistance to crocking and dry cleaning solvents.

EXAMPLE III

To prepare the azo compound:

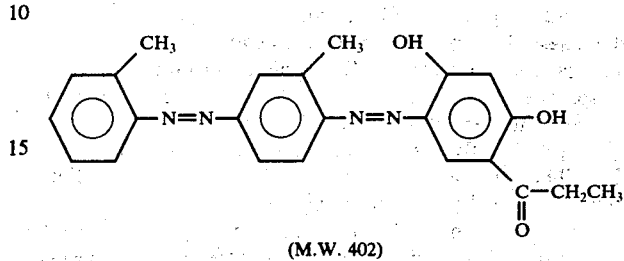

(M.W. 402)

a mixture of 33.8 g. 4-o-tolylazo-o-toluidine in 52.5 g. 32% hydrochloric acid and 200 ml. water was diazotized at 0° C with a solution of 10.5 g. sodium nitrite dissolved in 100 ml. water. After stirring 2 hours at 0° C, excess nitrous acid was destroyed with sulfamic acid and the diazo solution was clarified. The clear diazo solution was added during one half hour at 0° C to a solution of 24.9 g. 2,4-dihydroxypropiophenone prepared as described in Example II. After coupling was complete, the mixture was filtered and the cake was washed with water. The product was then reslurried in water and was made acidic to Congo Red paper with hydrochloric acid. The mass was filtered and the cake was washed neutral with water.

Yield: 49.3 g. Theory: 60.3 g.

When this product was dispersed and applied to nickel-containing polypropylene material as in Example I(C), strong burnt orange shades were obtained of outstanding light fastness and excellent resistance to crocking and dry cleaning solvents.

EXAMPLES IV – XXVIII

Following the procedures outlined in the foregoing examples, dyes are prepared as shown in Table I. The table may be read in conjunction with the general formula:

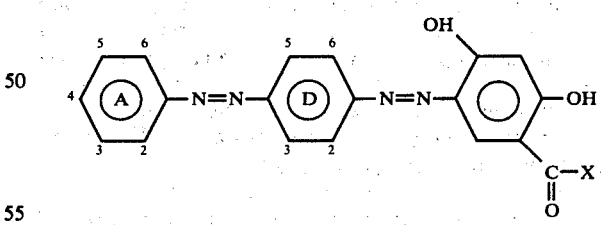

Nickel-containing polypropylene is dyed with each compound to produce dyeings having good fastness properties and having the shades indicated in the table.

TABLE I

| Example | Substituents on Ring A | Substituents on Ring D | X | Shade |
| --- | --- | --- | --- | --- |
| IV | 4-$NO_2$ | 2-$OCH_3$ | —$C_2H_5$ | Yellowish Brown |
| V | 3-$CH_3$ | 3-$CH_3$ | —$C_6H_5$ | Reddish Orange |

TABLE I-continued

| Example | Substituents on Ring A | Substituents on Ring D | X | Shade |
|---|---|---|---|---|
| VI | 2-CH$_3$ | 2-CH$_3$ | —⟨O⟩—Cl | Reddish Orange |
| VII | 2-OCH$_3$ | 3-Cl, 2-CH$_3$ | —CH$_3$ | Orange |
| VIII | 4-C$_2$H$_5$ | 2-OC$_2$H$_5$ | —C$_6$H$_5$ | Reddish Orange |
| IX | 4-NO$_2$ | 2,5-di-OCH$_3$ | —C$_2$H$_5$ | Yellowish Brown |
| X | — | 2,3-Benz | —CH$_3$ | Reddish Brown |
| XI | — | 2,5-di-CH$_3$ | —⟨O⟩—Cl | Reddish Orange |
| XII | 4-C$_2$H$_5$ | — | —CH$_3$ | Orange |
| XIII | 4-n-Bu | — | —C$_6$H$_5$ | Reddish Orange |
| XIV | 3-Cl; 2-CH$_3$ | — | —C$_2$H$_5$ | Burnt Orange |
| XV | 2-CF$_3$ | 2-CH$_3$ | —C$_2$H$_5$ | Burnt Orange |
| XVI | 2-Cl; 5-CF$_3$ | 2,5-di-OCH$_3$ | —C$_2$H$_5$ | Burnt Orange |
| XVII | 2-CN | 2,3-Benz | —CH$_3$ | Reddish Brown |
| XVIII | 4-CN; 2,5-di-OCH$_3$ | 2-OCH$_3$ | —C$_6$H$_5$ | Burnt Orange |
| XIX | 4-NO$_2$; 2,6-di-Cl | — | —C$_2$H$_5$ | Brown |
| XX | 2-COOCH$_3$ | 2-OCH$_3$ | —C$_2$H$_5$ | Orange |
| XXI | 2,3-Benz | — | —CH$_3$ | Brown |
| XXII | 2-CH$_3$; 4-Cl | 2-CH$_3$ | —⟨O⟩—CH$_3$ | Reddish Orange |
| XXIII | 4-n-Bu | 3-Cl; 2-CH$_3$ | —CH(CH$_3$)$_2$ | Burnt Orange |
| XXIV | 4-COOC$_2$H$_5$ | 2,5-di-OCH$_3$ | —CH$_2$—C$_6$H$_5$ | Burnt Orange |
| XXV | 4-NH—COCH$_3$ | — | —⟨O⟩—Br | Reddish Orange |
| XXVI | 4-COOH | 2,5-di-OCH$_3$ | ⟨O⟩-OCH$_3$ | Reddish Orange |
| XXVII | 4-C$_6$H$_5$—CO | — | —C$_3$H$_7$(n) | Burnt Orange |
| XXVIII | 2-OH | 2-CH$_3$ | —C$_2$H$_5$ | Orange |

Although the invention has been described in conjunction with the foregoing examples, it is not to be limited thereto, but instead includes all those embodiments within the scope and spirit of the appended claims.

What is claimed is:

1. An acyldihydroxybenzene disazo dye of the formula:

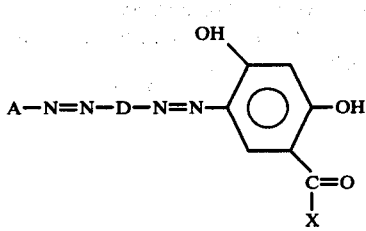

wherein
  A is phenyl, naphthyl, phenyl substituted by up to three substituents or naphthyl substituted by up to two substituents, said substituents being independently selected from alkyl of 1–4 carbons; alkoxy of 1–4 carbons; nitro; cyano; chloro; bromo; trifluoromethyl; hydroxy; RCOO—, where R is alkyl of 1–4 carbons; carboxy; and ROOC—, where R is alkyl of 1–4 carbons;
  D is phenyl, naphthyl, or phenyl or naphthyl substituted by up to 2 substituents independently selected from alkyl of 1–4 carbon atoms, alkoxy of 1–4 carbon atoms, chlorine or bromine; and
  X is alkyl of 1–4 carbon atoms, benzyl, phenyl or phenyl substituted by up to two substituents independently selected from alkyl of 1–4 carbon atoms, alkoxy of 1–4 carbon atoms, chloro and bromo.

2. Metallized polyolefin textile dyed with a dye of the formula:

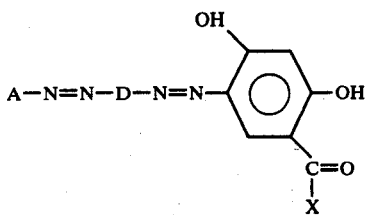

wherein A, D and X are as defined in claim 1.

3. The dye of claim 1 of the formula,

4. The dye of claim 1 of the formula,

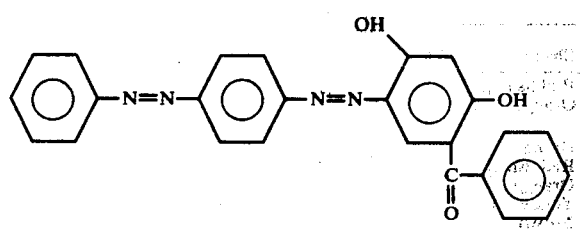

5. The dye of claim 1 of the formula,

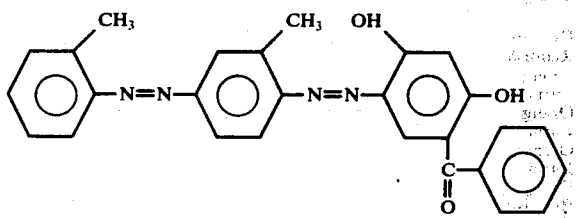

6. The dye of claim 1 of the formula,

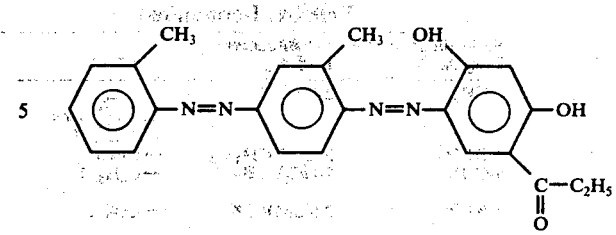

7. The dye of claim 1 of the formula,

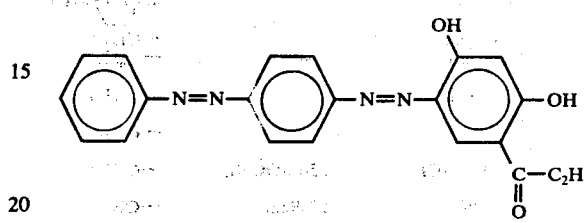

8. The dye of claim 1 of the formula,

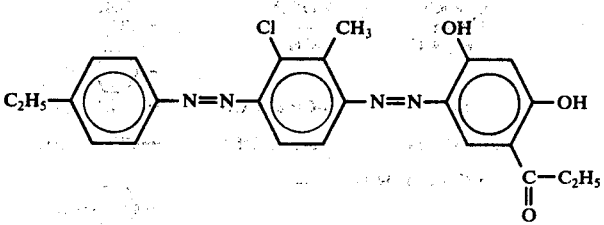

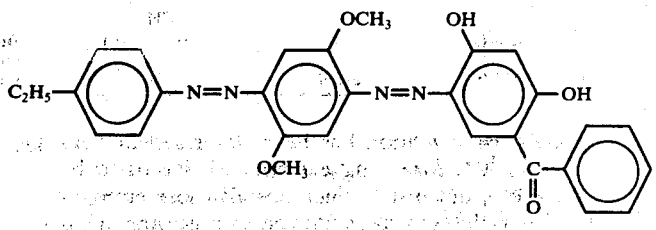

9. The dye of claim 1 wherein A is phenyl, or phenyl substituted by up to 2 substituents selected from alkyl of 1–4 carbon atoms or alkoxy of 1–4 carbon atoms, D is phenyl, or phenyl substituted by up to 2 substituents selected from alkyl of 1–4 carbon atoms, alkoxy of 1–4 carbon atoms or chloro, and X is alkyl of 1–4 carbon atoms, or phenyl.

* * * * *